(12) United States Patent
Ito (10) Patent No.: US 7,413,396 B2
(45) Date of Patent: Aug. 19, 2008

(54) ARTICLE STORAGE FACILITY AND SYSTEM FOR THE SAME (75) Inventor: Yasuhisa Ito, Aichi (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 133 days.

(21) Appl. No.: 11/231,765

(22) Filed: Sep. 22, 2005

(65) Prior Publication Data
US 2006/0067809 A1 Mar. 30, 2006

(30) Foreign Application Priority Data
Sep. 28, 2004 (JP) ............... 2004-280920

(51) Int. Cl.
B65G 1/04 (2006.01)
(52) U.S. Cl. .............. 414/626; 414/940; 700/215
(58) Field of Classification Search ........... 414/274, 414/331.05, 626, 940; 700/215
See application file for complete search history.

(56) References Cited

U.S. PATENT DOCUMENTS

| 3,986,612 | A | * | 10/1976 | Kamm et al. | 209/587 |
| 4,812,985 | A | * | 3/1989 | Hambrick et al. | 700/215 |
| 4,867,629 | A | * | 9/1989 | Iwasawa et al. | 414/331.05 |
| 5,607,275 | A | * | 3/1997 | Woodruff et al. | 414/331.05 |
| 5,964,374 | A | * | 10/1999 | Yuyama et al. | 221/17 |
| 6,183,184 | B1 | * | 2/2001 | Shiwaku | 414/281 |
| 6,336,546 | B1 | * | 1/2002 | Lorenz | 198/346.2 |
| 6,450,318 | B1 | * | 9/2002 | Minardi | 198/346.3 |
| 2004/0109746 | A1 | | 6/2004 | Suzuki | |
| 2004/0265107 | A1 | * | 12/2004 | Kim et al. | 414/626 |

FOREIGN PATENT DOCUMENTS

| DE | 4028059 A1 | 3/1992 |
| EP | 0431823 A | 6/1991 |
| JP | 57156906 A | 9/1982 |
| JP | 62-297050 | 12/1987 |
| JP | 8-244917 | 9/1996 |
| JP | 10-45213 | 2/1998 |
| JP | 2004-250148 | 9/2004 |

OTHER PUBLICATIONS

European Search Report dated Jan. 23, 2006, issued in corresponding European Application No. 05 02 0690.
English Translation of the Notification of Reason(s) for Refusal of Japanese Patent Application No. 2004-280920 from the Japanese Patent Office.

* cited by examiner

Primary Examiner—James Keenan
(74) Attorney, Agent, or Firm—Westerman, Hattori, Daniels & Adrian, LLP (57) ABSTRACT A storage shelf 4 is provided which has, for example, two rotatable mounts 18, 19. A notch 41 is formed in the mount 18 so that a cassette 34 can be freely transferred between the lower mount 19 and an overhead travelling carriage 8. ID readers 6 are provided on poles 16, 17 of the mounts 18, 19, respectively. Thus, the ID 36 of the cassette is read and memorized in a storage shelf file 13. The IDs of stored articles can be managed, resulting in advanced operations.

4 Claims, 8 Drawing Sheets

ARTICLE STORAGE FACILITY AND SYSTEM FOR THE SAME

FIELD OF THE INVENTION

The present invention relates to an article storage facility that delivers and receives an article directly to and from an overhead travelling carriage for storage as well as a system for the article storage facility.

BACKGROUND OF THE INVENTION

The applicant has disclosed a method of temporarily storing an article from an overhead travelling carriage by hanging storage shelves from a running rail for the overhead travelling carriage (The Japanese Patent No. 3067,682). The inventor noted that to appropriately operate such storage shelves, it is necessary to clearly manage which article is stored, which storage shelf is used to store the article, and a position where the article is stored. Thus, the inventor attempted to provide an ID reader on the overhead travelling carriage to read the ID of the article. However, the ID reader interfered with the transfer of the article. Accordingly, it was difficult to provide the ID reader on the overhead travelling carriage.

It is a basic object of the present invention to enable the IDs of articles stored on the storage shelves to be reliably managed. It is an additional object of the present invention to allow one ID reader to read the IDs of articles even with a plurality of storage positions. It is a further additional object of the present invention to enable each storage position on the mount to be set with respect to one stop position of the overhead travelling carriage so that an article can be freely transferred to and from the storage position and to allow one ID reader to read the IDs of a plurality of articles on the mount.

SUMMARY OF THE INVENTION

The present invention provides an article storage facility characterized by comprising a storage shelf comprising a storage position to and from which an overhead travelling carriage running along a running rail can transfer an article directly, an ID reader which reads an ID of an article not stored on the storage shelf yet or an article already stored on the storage shelf, and memorizing means for memorizing the ID of the article read by the ID reader and a position where the article is stored. The article storage facility according to the present invention does not include a storage facility such as an automatic warehouse which comprises means for transferring articles to storage positions. The ID is read, for example, while the overhead travelling carriage is placing an article onto the storage shelf or after the overhead travelling carriage has stored the article on the storage shelf.

Preferably, the storage shelf comprises a plurality of storage positions, and the ID reader is provided at a most upstream position of the storage shelf at which the ID of the article supported by the overhead travelling carriage can be read.

Preferably, the storage shelf comprises a plurality of storage positions, and the facility has means for moving the ID reader relative to each of the storage positions so that the common ID reader can read the ID of the article even with the plurality of storage positions. In this case, the ID reader may be moved or the each of the storage positions may be moved relative to the ID reader.

Moreover, preferably, the storage shelf comprises a pole and a mount which has a plurality of storage positions and which is rotatively movable with respect to the pole, and the ID reader is provided on the pole so that the mount is rotatively moved to set each storage position so as to allow the article to be freely transferred between the storage position and the overhead travelling carriage.

The present invention also provides an article storage facility system comprising an overhead travelling carriage which runs along a running rail and on which a drivingly raising and lowering section is mounted, the drivingly raising and lowering section raising and lowering a platform which chucks an article, the overhead travelling carriage transferring an article to a load port in a processing device located below the running rail in a vertical direction, a storage shelf placed beside and below the running rail and comprising a storage position to and from which the overhead travelling carriage can transfer an article directly, an ID reader which reads an ID of an article not stored on the storage shelf yet or an article already stored on the storage shelf, and memorizing means for memorizing the ID of the article read by the ID reader and a position where the article is stored, the system being characterized in that the overhead travelling carriage comprises a laterally feeding device which laterally feeds the drivingly raising and lowering section to above the storage position, in order to transfer an article to the storage position.

Preferably, the storage position is provided where the overhead travelling carriage stopped in order to transfer an article to the load port can freely transfer the article without needing to move.

Further, preferably, while the overhead travelling carriage is conveying the article, if an article having a higher priority occurs at the load port, the article being transferred is placed on the storage shelf, the memorizing means memorizes the storage position, and the article with the higher priority is conveyed from the load port.

In the present invention, when or after an article is stored on the storage shelf, the ID reader reads the ID of the article and the memorizing means memorizes the ID. The overhead travelling carriage transfers the article directly to and from the storage shelf. No manual operations are required and it is unnecessary to temporarily store the article in a buffer before the article is loaded onto the storage shelf. This allows the article with the ID read by the ID reader to be reliably stored at a predetermined storage position. Thus, the stored article can be reliably managed using its ID. Further, the locations of articles can be managed even if the storage shelf is used to temporarily store various articles with different storing reasons or times.

Moreover, the present invention enables the overhead travelling carriage system not only to more appropriately serve as a buffer that temporarily stores articles but also to operate versatilely and flexibly. For example, if a load port is occupied onto which the overhead travelling carriage is to convey an article, the conveyed article can be temporarily stored in the article storage facility so that the article at the load port can be conveyed first. Further, while an article is being conveyed, if the urgent need arises to convey another article, the article being conveyed can be temporarily stored in the article storage facility to allow the urgent article to be conveyed.

Preferably, the storage shelf comprises a plurality of storage positions, and the ID reader is provided at the most upstream position of the storage shelf at which the ID of the article supported by the overhead travelling carriage can be read. This enables one ID reader to read the ID of the conveyed article before the article is placed on the storage position.

Preferably, the storage shelf comprises the plurality of storage positions, and the ID reader moves relative to each of the storage positions. Consequently, one ID reader can read the IDs of articles stored even with the plurality of storage positions. This enables a reduction in the number of ID readers.

Particularly preferably, rotative movement of the mount enables each storage position to be set so that an article can be transferred between the overhead travelling carriage and the mount. Further, rotative movement of the mount enables the ID reader to read the ID of the article at each storage position. Therefore, for example, one mount requires only one ID reader.

Further, the load port in the processing device, located below the running rail in the vertical direction, is provided with the laterally feeding device which moves the drivingly raising and lowering section to above the storage position, the drivingly raising and lowering section raising and lowering the platform which chucks an article. This enables the article to be easily transferred to and from both the load port and the storage position, located beside and below the running rail. Thus, if for example, a load port is occupied onto which the overhead travelling carriage is to convey an article, the loaded article can be temporarily stored in the article storage facility so that the article at the load port can be conveyed first. In this case, since in the article storage facility, the memorizing means memorizes the ID of the stored article and its storage position, the location of the temporarily stored article can be reliably managed.

Preferably, the storage position is provided where the overhead travelling carriage stopped in order to transfer an article to the load port can freely transfer the article without needing to move. This allows the following operation to be easily performed. If for example, a load port is occupied onto which the overhead travelling carriage is to convey an article, the conveyed article can be temporarily stored in the article storage facility so that the article at the load port can be conveyed first.

Further, preferably, while the overhead travelling carriage is conveying the article, if an article having a higher priority occurs at the load port, the article being transferred is placed on the storage shelf, the memorizing means memorizes the storage position, and the article with the higher priority is conveyed from the load port. Accordingly, even if while an article is being conveyed, another article with a high priority occurs at the load port to which the first article is being conveyed, the article with the higher priority can be conveyed from the load port first without losing track of the article being conveyed.

DETAILED DESCRIPTION OF THE PREFERRED EMBODIMENTS

A description will be given below of the optimum embodiment of the present invention.

FIGS. 1 to 8 show an embodiment and its variations. FIGS. 1 to 5 show the embodiment, in which 2 is an article storage facility composed of a storage shelf 4, an ID reader 6, and a storage shelf file 13. 8 is an overhead travelling carriage and 10 is a processing device for semiconductors or liquid crystals. 12 is a distribution controller which manages an overhead travelling carriage system or the storage shelf 4 and which comprises the storage shelf file 13. 14 is an overhead travelling carriage controller that manages a system for the overhead travelling carriage 8. It is possible to consider the storage shelf 4 to be a part of the overhead travelling carriage system and to provide the storage shelf file 13 in the overhead travelling carriage controller 14. Then, the article storage facility 2 or overhead travelling carriage system and the processing device 10 are provided in, for example, a clean room.

Figure 1:
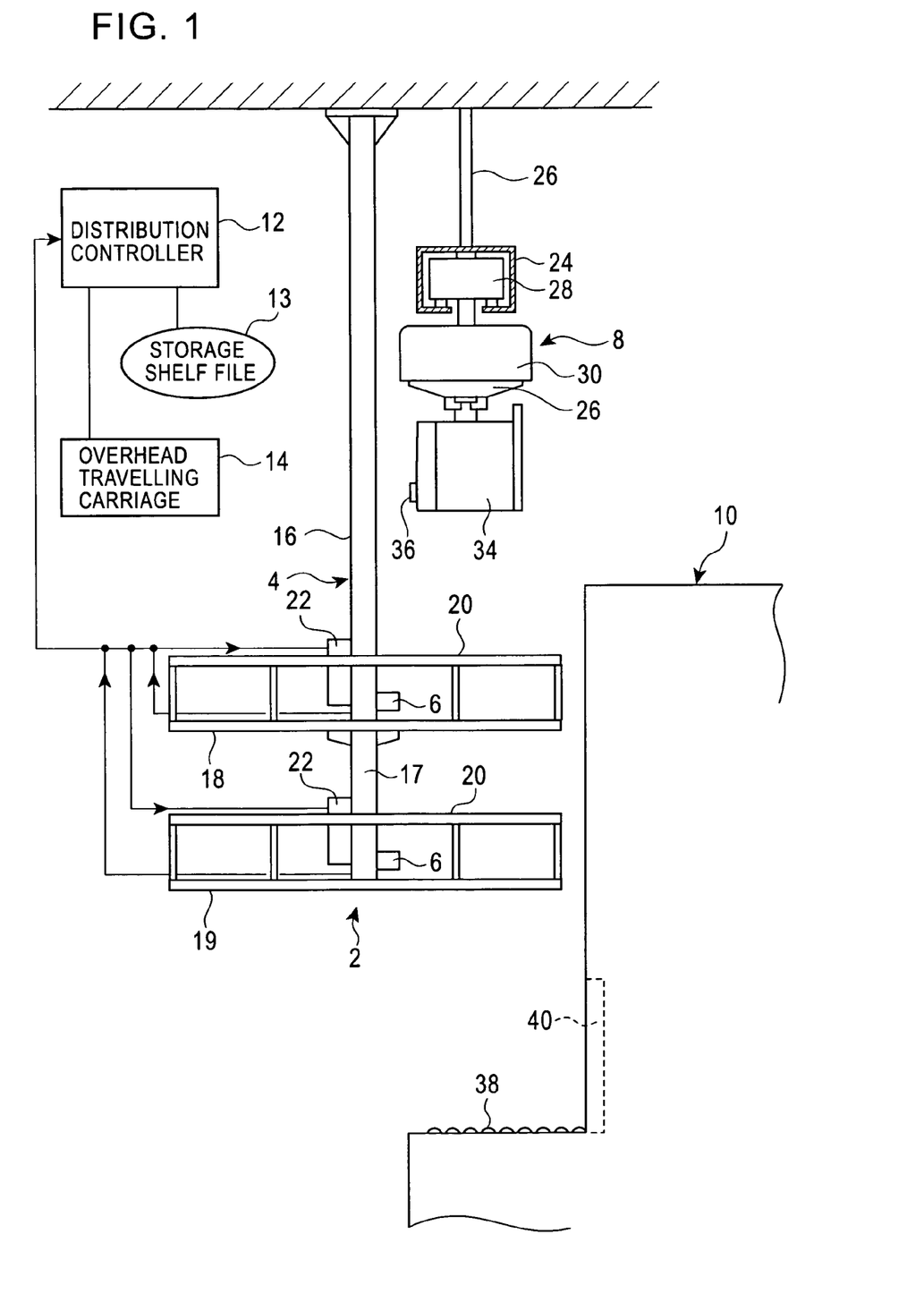
FIG. 1 is a front view showing an article storage facility and an overhead travelling carriage according to an embodiment.

The storage shelf 4 has two mounts 18, 19 arranged in parallel in a vertical direction and on which a plurality of placement positions are formed. The mount 18 is supported on a ceiling of the clean room using, for example, a pole 16. The mount 19 is attached to the bottom of the pole 16 using a pole 17. The pole 16 is fixed and the mount 18 can be rotated through 360 degrees with respect to the pole 16 together with the pole 17. The lower mount 19 can be rotated through 360 degrees with respect to the pole 17. In this case, the two mounts 18, 19 are arranged in parallel in the vertical direction. However, three or more mounts may be are arranged in parallel in the vertical direction or only one mount may be provided.

20 is a fall preventing fence that need not necessarily be provided. 22 is a motor that rotates the mount 18 with respect to the pole 16 and rotates the mount 19 with respect to the pole 17. Moreover, one ID reader 6 is provided in each of the mounts 18, 19 and is attached to, for example, the poles 16, 17 sides. The ID reader 6 and the motor 22 are connected to the distribution controller 12.

The overhead travelling carriage system is composed of a running rail 24, the overhead travelling carriage 8, and the overhead travelling carriage controller 14. The running rail 24 is supported on the ceiling of the clean room or the like using a pole 26. 28 is a carriage and 30 is a drivingly raising and lowering section that raises and lowers a platform 32. The platform 32 rises and lowers while chucking a cassette 34 that is an example of an article. For example, an ID 36 is attached to a rear side of the cassette 34. The ID is of an arbitrary type and may be a bar code or an RFID (ID that can be read and written by radio).

In the processing device 10, a load port 38 is provided immediately below the running rail 24 so that the cassette 34 can be conveyed into and out of the processing device 10 via a door 40. A manufacturing controller (not shown in the drawings) manages articles in the load port 38 and processing device 10. The overhead travelling carriage controller 14 manages an article being conveyed by the overhead travelling carriage 8. The storage shelf file 13 manages an article temporarily stored on the storage shelf 4.

Figure 2:
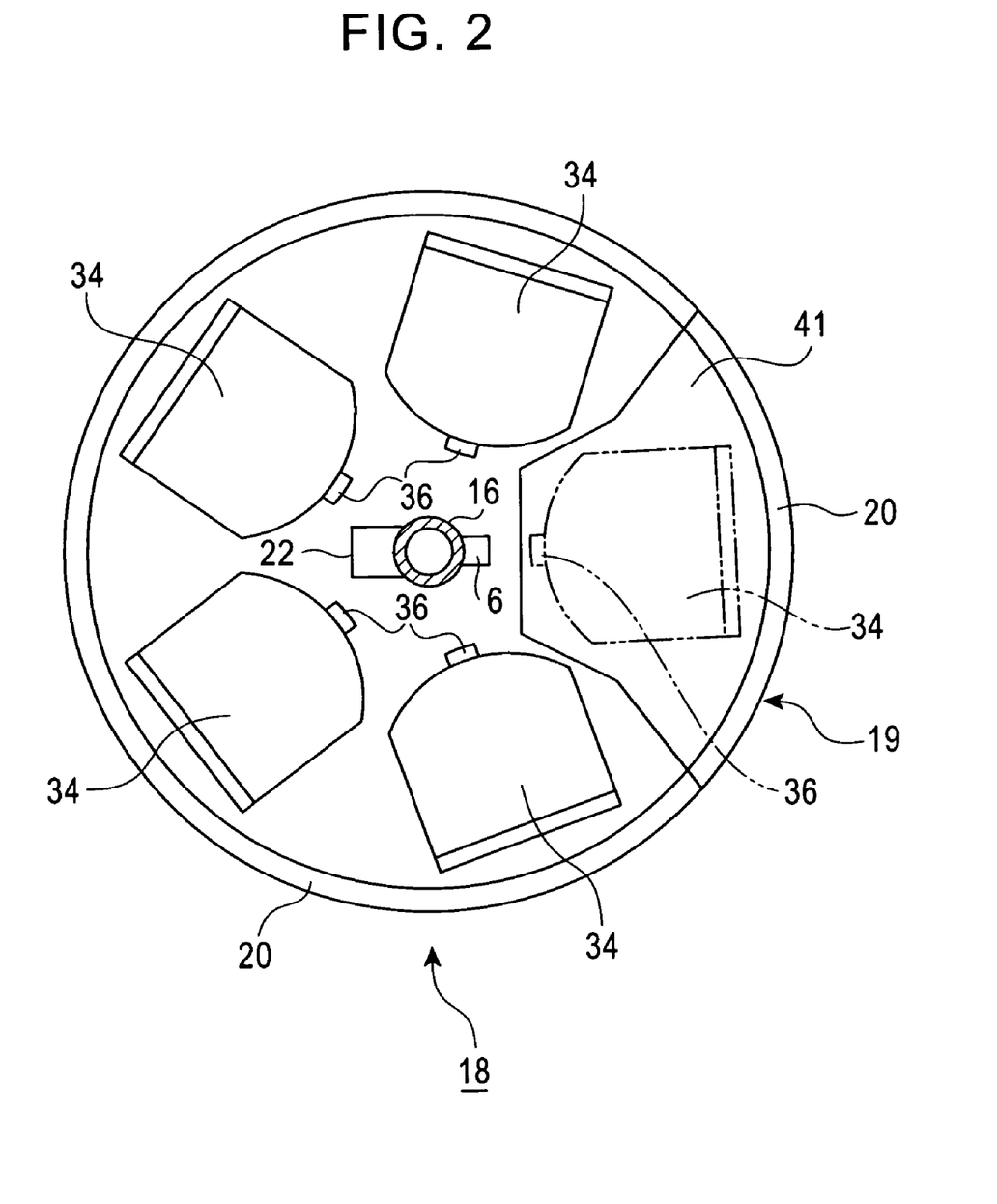
FIG. 2 is a plan view of a shelf in the article storage facility.

FIG. 2 shows the mount 18 and the mount 19 as viewed from directly above. A notch 41 is formed in the upper mount 18 so that the cassette 34 can pass through the mount 18. Thus, the overhead travelling carriage 8 can freely transfer the cassette 34 directly to and from either of the mounts 18, 19. Further, when the notch 41 is formed in the lower mount 19, the cassette 34 can be freely transferred between the lower mount 19 and the load port through the notch 41. Consequently, the storage shelf 4 can be provided at a position where it may interfere with the load port 38, for example, immediately above the load port 38. In the embodiment, rotating each of the mounts 18, 19 through 72 degrees sets each placement position so that the cassette 34 can be freely transferred between the mounts 18, 19 and the overhead travelling carriage 8. Further, at the position set with respect to the overhead travelling carriage 8, the ID reader 6 can read the ID 36.

The ID 36 may be read while the cassette 34 remains chucked by the platform or after the cassette 34 has been unloaded onto the mounts 18, 19. In particular, when the ID 36 is read while the cassette 34 remains chucked by the platform, the lower mount 19 need not be provided with the ID reader 6. Moreover, the cassette 34 can be more reliably managed by reading the ID 36 not only when the cassette 34 is unloaded onto the mounts 18, 19 but also when the cassette 34 from the mount 18 or the mount 19 is loaded.

Figure 3:
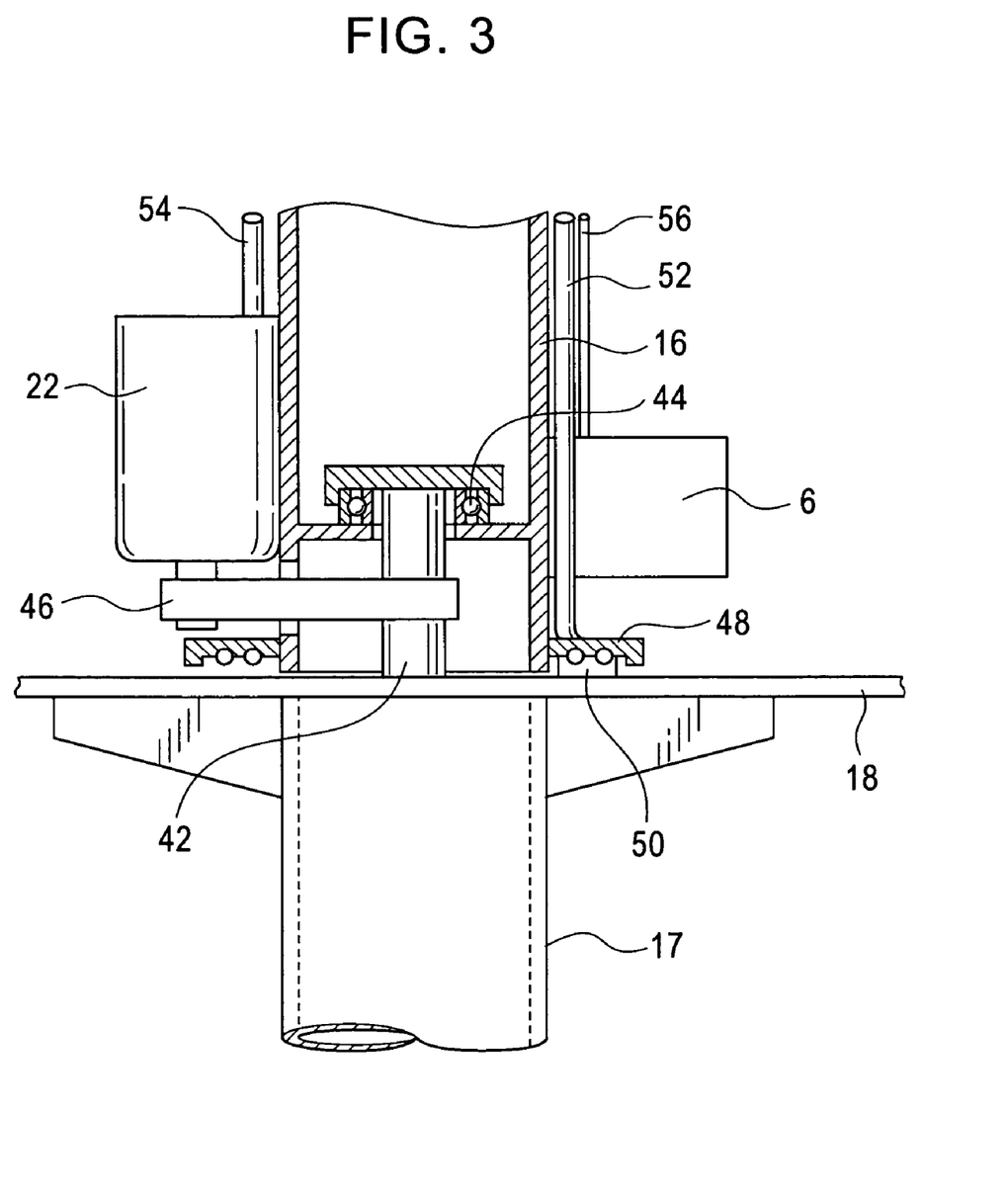
FIG. 3 is a partly cutaway front view of an essential part of a rotating mechanism for a mount in the article storage facility.

FIG. 3 shows a mechanism that rotates the mount 18 with respect to the pole 16. 42 is a shaft of the pole 17 which can be rotated with respect to the pole 16 while being supported by a bearing 44. The driving force of the motor 22 rotates the shaft 42 via transmission means 46 such as a belt. For electric connections to the motor and ID reader on the lower mount, for example, a flange 48 is provided on the pole 16 and wiring is laid on a bottom surface of the flange 48. The wiring is contacted with a brush 50 provided on the mount 18 for electric connections. 52, 54, 56 denote wiring cables.

FIG. 1 will be referred to again. If the article is unloaded from the overhead travelling carriage 8 onto the storage shelf 4, the distribution controller 12 searches the storage shelf file 13 for a free placement position on the mounts 18, 19. The motor 22 is then utilized to rotate the mounts 18, 19 so that the position determined lies immediately above the position where the overhead travelling carriage 8 is stopped. The platform 32 is lowered and the cassette 34 is unloaded. The ID reader 6 reads the ID 36 of the cassette 34 during or after the unloading and communicates the read ID 36 to the distribution controller 12. The distribution controller 12 memorizes the number of the storage shelf 4, either the mounts 18, 19, and the placement position in the mount in the storage shelf file 13 as a shelf address together with the ID of the article. The shelf address is data indicating the storage shelf on which the article is located and the position on the storage shelf at which the article sits.

If an article from the storage shelf 4 is loaded onto the overhead travelling carriage 8, the distribution controller 12 searches the storage shelf file 13 for the position at which the article to be loaded can be placed. To index the overhead travelling carriage 8 to the retrieved placement position, the distribution controller 12 then instructs the storage shelf 4 to pre-rotate the mounts 18, 19 using the motor 22. When the overhead travelling carriage 8 is indexed to the position where the article can be loaded onto the overhead travelling carriage 8, the ID reader 6 can read the ID 36 at the same position. In this manner, the ID 36 of the cassette 34 can be read both when the article is stored and when it is retrieved. In addition, a kind of inventory taking can be carried out by rotating the mounts 18, 19 and reading the ID of each stored article.

Figure 4:
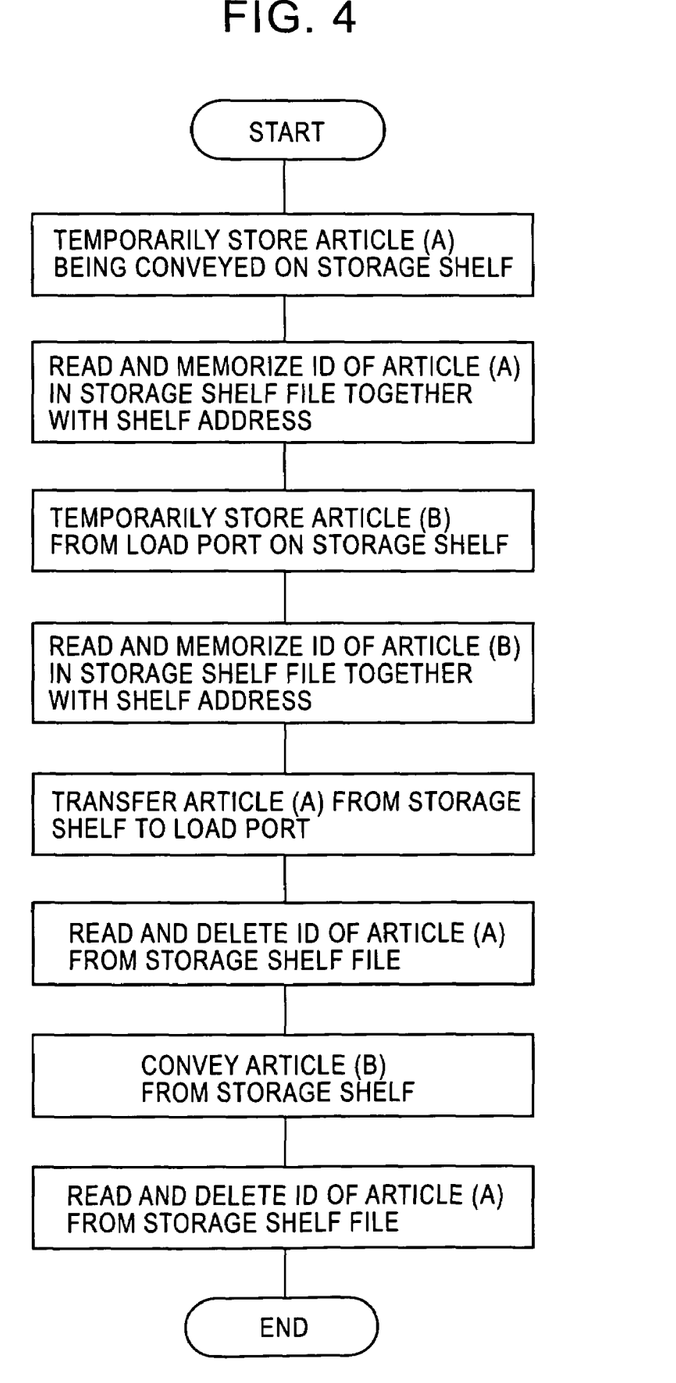
FIG. 4 is a flowchart showing a conveyance algorithm using the article storage facility.

FIG. 4 shows an example of a conveyance algorithm using the article storage facility according to the embodiment. In this case, it is assumed that the storage shelf is located immediately above the load port and that at the same stop position, the overhead travelling carriage 8 can freely transfer the article to and from any of the upper and lower mounts and load port. An article A is conveyed by the overhead travelling carriage 8 in order to be loaded onto the load port. A processed article B is concurrently conveyed from the load port. When the overhead travelling carriage 8 arrives, it unloads the article A onto either the upper or lower mount. On this occasion, the ID reader reads the ID of the article and memorizes it in the storage shelf file together with the shelf address. Then, the article B from the load port is loaded onto the overhead travelling carriage 8, which then temporarily places the article B on the mount. Also on this occasion, the ID of the article B is read and memorized in the storage shelf file together with the shelf address.

The mount is rotated to index the article A so that the overhead travelling carriage 8 can load the article A onto the load port. The overhead travelling carriage 8 transfers the article A to the load port. Also at this time, the ID of the article A is read. The ID of the article A and its shelf address are deleted from the storage shelf file. Then, the mount is rotated again and the overhead travelling carriage 8 conveys the article B to its destination. Also at this time, the ID of the article A is read. The ID of the article A and its shelf address are deleted from the storage shelf file.

In this manner, one conveying operation of the overhead travelling carriage enables the article to be conveyed to and from the load port. In FIG. 4, the ID of the article is read four times in order to store and retrieve the articles A, B on and from the storage shelf. However, since this storage lasts only a short time, the reading of the ID may be simplified so that the ID is read, for example, only when the article is stored on the storage shelf.

Figure 5:
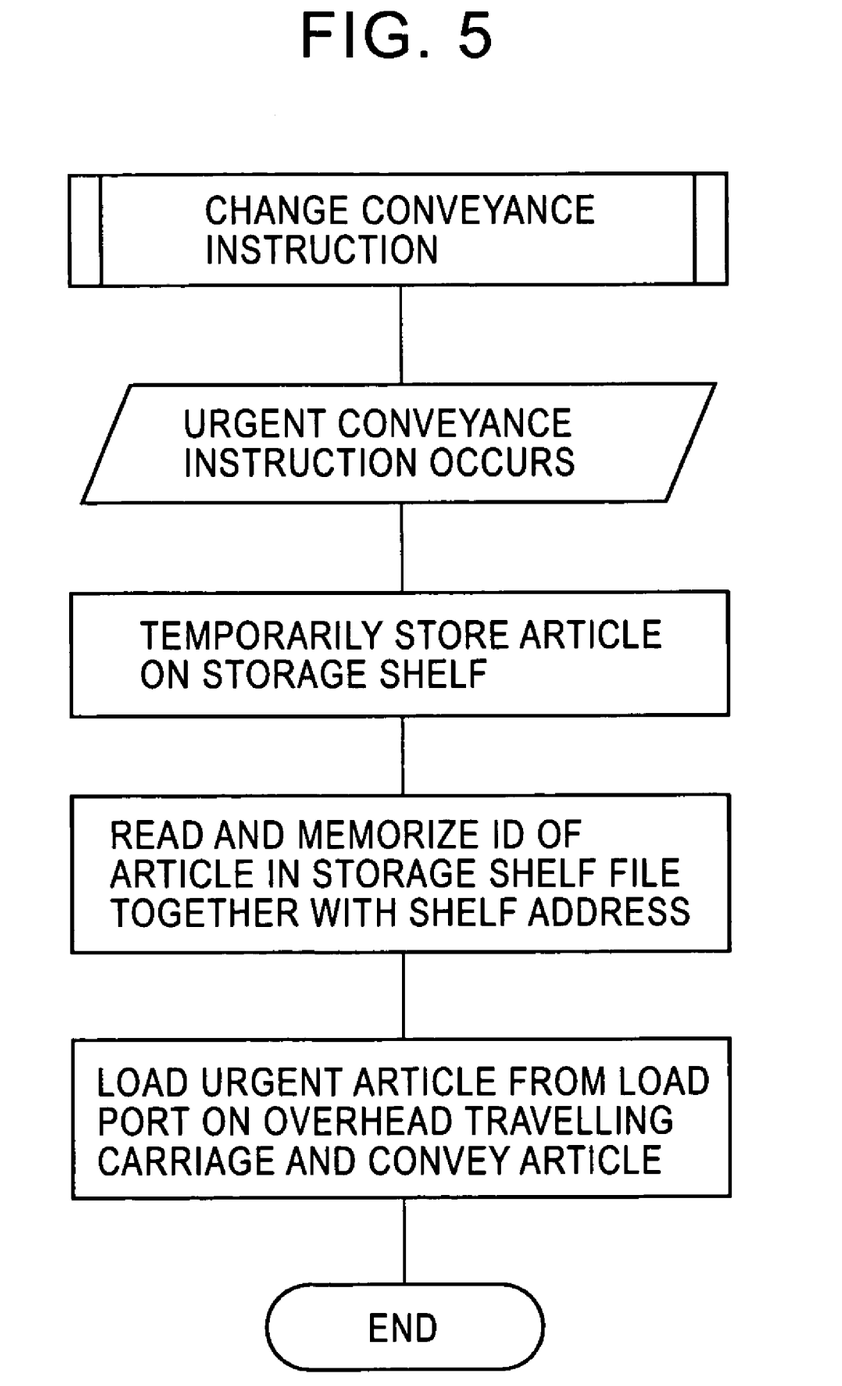
FIG. 5 is a flowchart showing another conveyance algorithm using the article storage facility.

FIG. 5 is a process executed if a conveyance instruction (urgent conveyance instruction) with a higher priority is given while an article is being conveyed by the overhead travelling carriage. The overhead travelling carriage conveying the article stops at an appropriate storage shelf. The overhead travelling carriage then temporarily stores the article on the storage shelf. On this occasion, the ID of the article is read and memorized in the storage shelf file together with the shelf address. Then, the overhead travelling carriage stops at the load port at which the urgent article is located. The urgent article is loaded onto the overhead travelling carriage, which then conveys the article. In this case, during the process of conveyance of the first article, the stored position changes from the overhead travelling carriage to the storage shelf. The memorized ID and shelf address prevent the location of the article from becoming unknown during conveyance. The storage shelf file can be utilized to allow the succeeding overhead travelling carriage to resume conveying the article.

Figure 6:
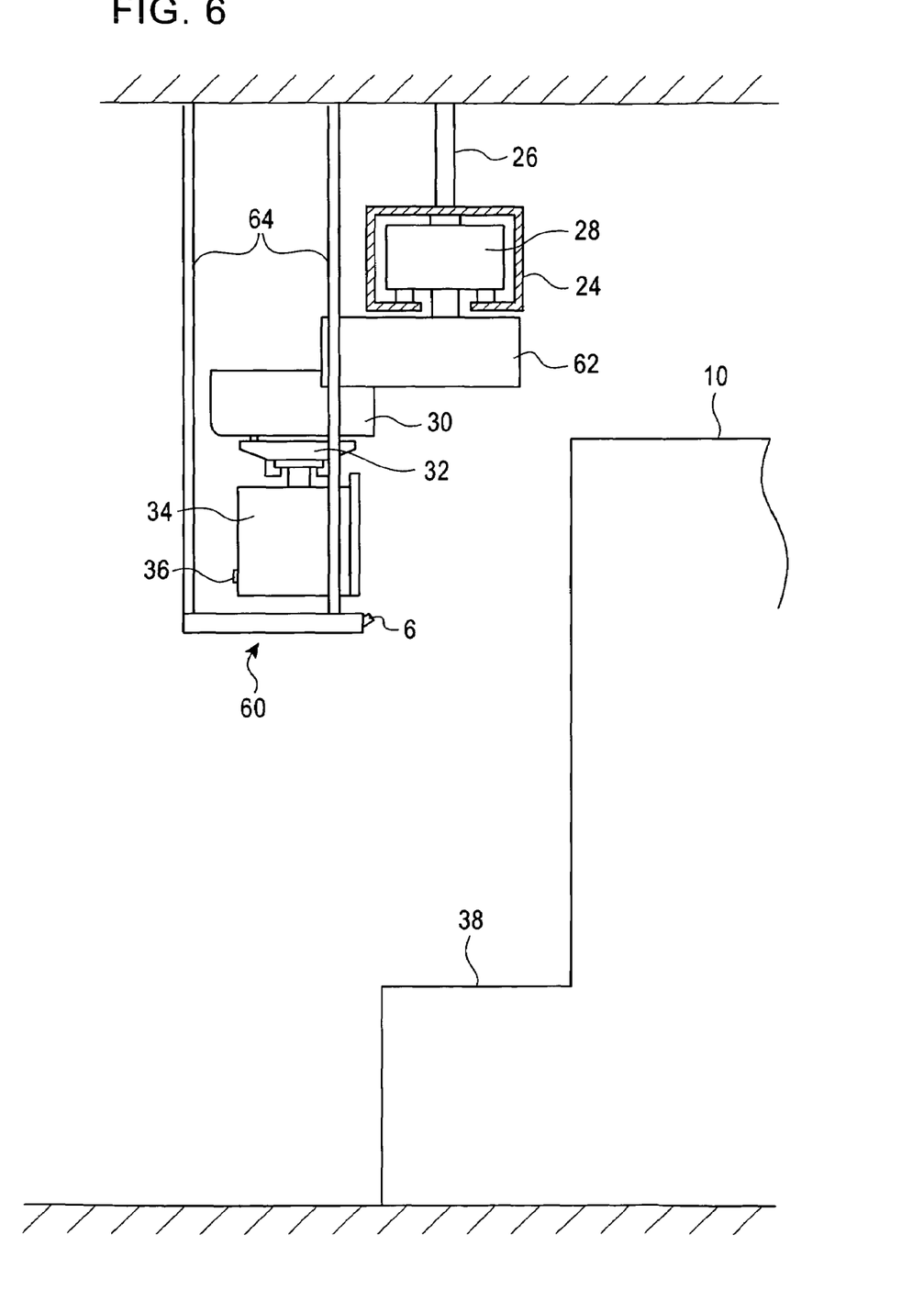
FIG. 6 is a front view showing an article storage facility for an overhead travelling carriage with a laterally feeding device according to a second embodiment.
Figure 7:
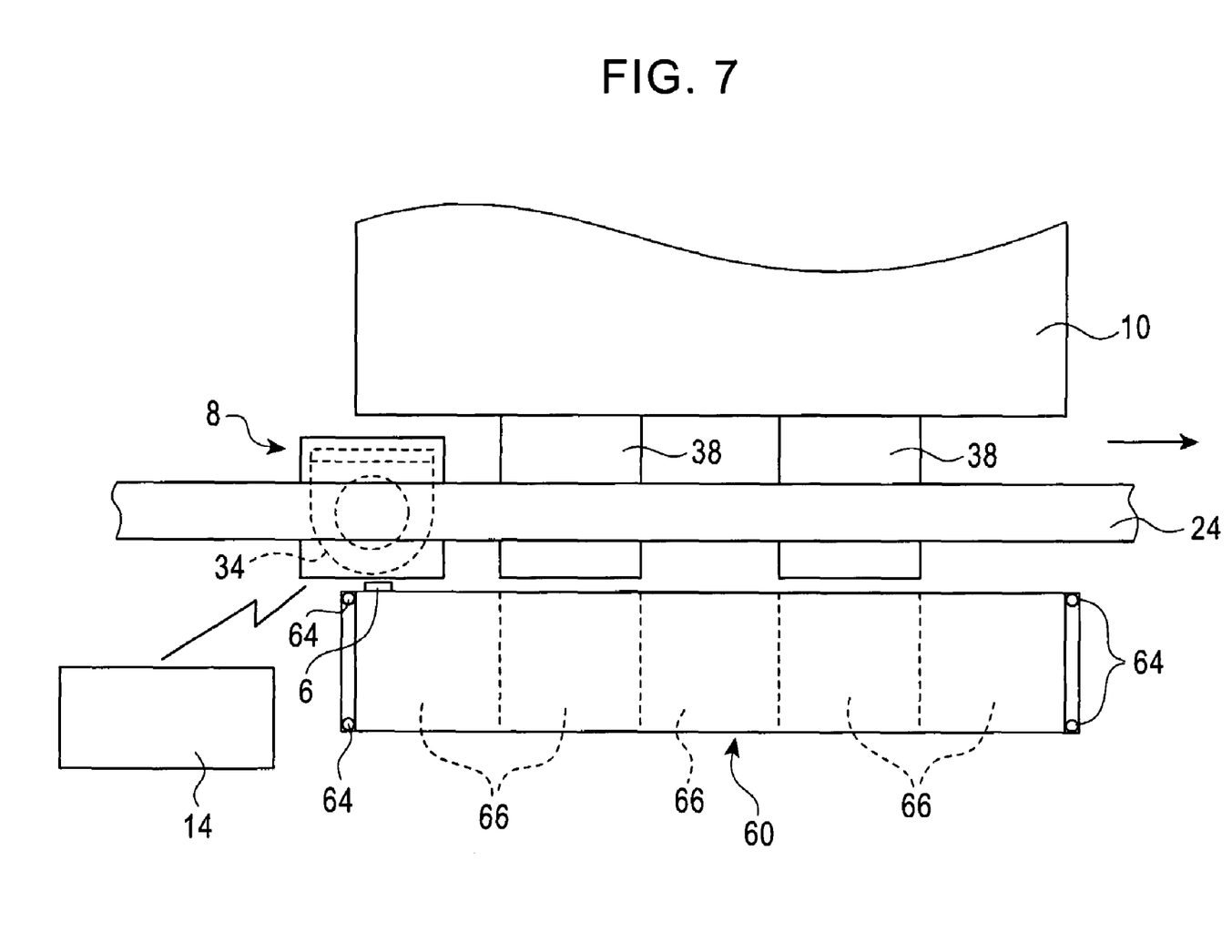
FIG. 7 is a plan view of the article storage facility and overhead travelling carriage in FIG. 6.

FIGS. 6 and 7 show a storage shelf 60 according to a second embodiment. In this example, a laterally feeding device 62 is provided between a tarvelling carriage 28 and a drivingly raising and lowering section 30 so that the drivingly raising and lowering section 30 can be laterally fed to above a placement position 66 described later. 64 is a pole of the storage shelf 60. The storage shelf 60 is provided with the ID reader 6 at its most upstream position so that the ID reader 6 reads an ID from an obliquely upward position. The ID 36 of the cassette 34 is thus read. The upstream and downstream sides are determined along the running direction of the overhead travelling carriage 8. For example, the overhead travelling carriage 8 is assumed to run from the left to right of FIG. 7. If the overhead travelling carriage 8 is to unload the cassette 34 onto the storage shelf 60, it notifies the ID reader 6 of this using communication means (not shown in the drawings). Upon receiving this notification, the ID reader 6 reads the ID of the passing cassette 34. The ID of the conveyed article can be read simply by providing one ID reader 6 for the storage shelf 60 having a plurality of placement positions 66 formed beside and below the running rail. At least one of the placement positions 66 is set so that the article can be freely transferred to this placement position 66 by the overhead travelling carriage 8 stopped at the load port of the processing device located below the running rail in the vertical direction.

Figure 8:
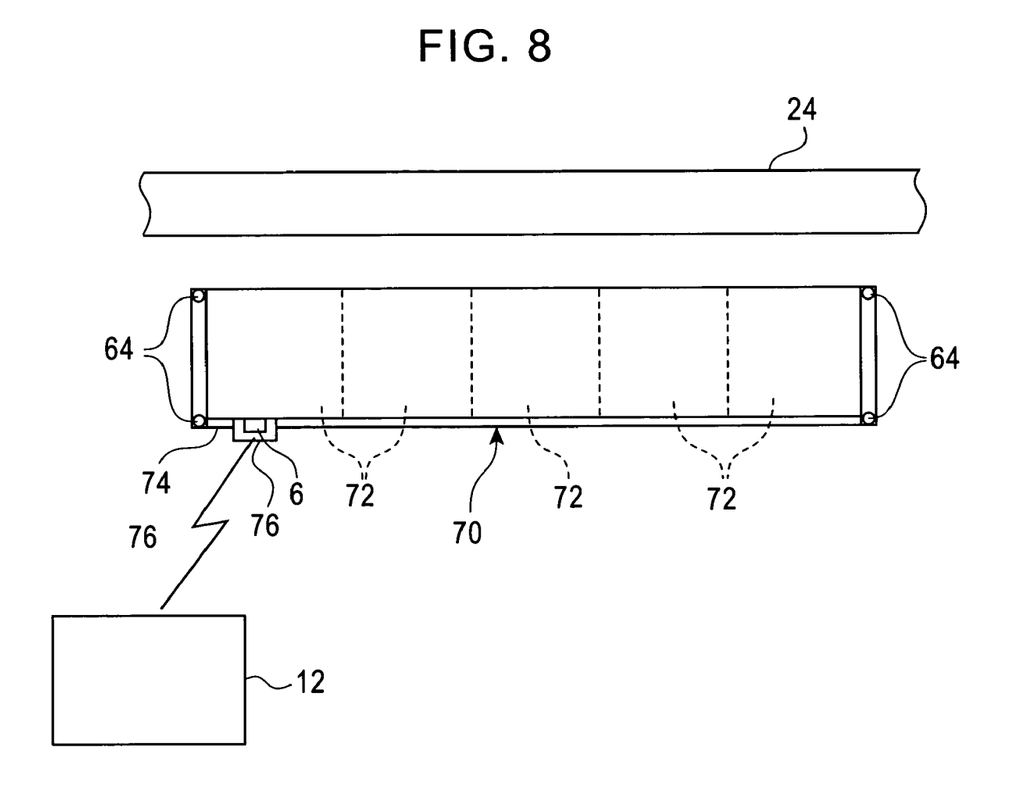
FIG. 8 is a plan view of an article storage facility according to a third embodiment.

A guide rail 74 is provided in a storage shelf 70 according to a third embodiment shown in FIG. 8, and the guide rail 74 extends in a longitudinal direction of the storage shelf 70. A running member 76 on which the ID reader 6 is mounted runs along the guide rail 74. This enables one ID reader 6 to read the ID of each article even with the storage shelf 70 comprising a plurality of placement positions 72. Further, the storage shelf 70 in FIG. 8 allows the ID of each article to be read not only when the article is stored on the storage shelf 70 but also when the article is retrieved from the storage shelf 70. Moreover, the IDs of all the articles can be checked.

In the embodiments, the brush 50 is utilized to supply power to electrically connect the motor, the ID reader, and a placement sensor on the lower mount to a power source. However, if a high cleanliness is required for clean conveyance, cables may be used to supply power as in the case with the upper mount. In this case, the pivoting angle of the mount is preferably limited to, for example, at most 360 degrees for both forward and backward rotations.

The invention claimed is:

1. An article storage facility system comprising:
   an overhead travelling carriage which runs along a running rail and comprises:
   (a) a drivingly raising and lowering section and,
   (b) a lateral feeding device which laterally feeds the drivingly raising and lowering section to above a storage position, in order to transfer an article to the storage position,
   a storage shelf placed beside and below the running rail and comprising:
   (a) said storage position to and from which the overhead travelling carriage directly transfers said article, and
   (b) an ID reader mounted on said storage shelf in an obliquely upward position relative to said storage shelf, which reads an ID of said article while it is being unloaded onto said shelf, and
   a memorizing means for memorizing the ID of the article read by the ID reader and said storage position where the article is stored,
   wherein said drivingly raising and lowering section raises and lowers a platform of said overhead travelling carriage which chucks an article, and
   wherein said overhead travelling carriage transfers said article to a load port in a processing device located below the running rail in a vertical direction.

2. The article storage facility system according to claim 1, wherein the storage position is provided at a location where the overhead travelling carriage stops, in order to freely transfer said article to the load port without said overhead travelling carriage needing to move.

3. The article storage facility system according to claim 1, wherein while the overhead travelling carriage is conveying the article, if an article having a higher priority than the article being transferred is present at the load port, then the article being transferred is placed on the storage shelf, the memorizing means memorizes the storage position, and the article with the higher priority is conveyed from the load port by said drivingly raising and lowering section.

4. The article storage facility system according to claim 1, wherein said ID reader is disposed on said storage shelf at a position which is passed first by said overhead travelling carriage in a running direction of said overhead travelling carriage.

* * * * *